Figure 1:
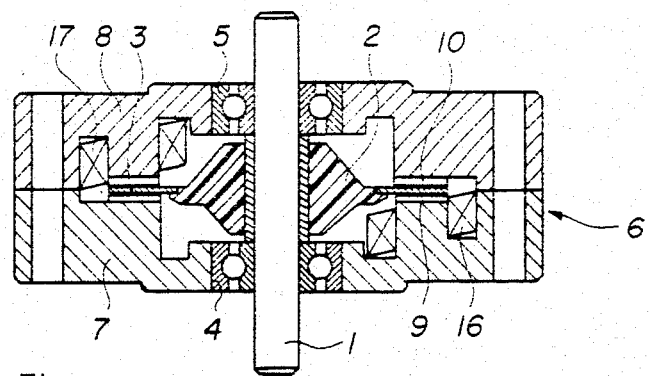

United States Patent [19]

Oudet

[11] Patent Number: 4,823,040
[45] Date of Patent: Apr. 18, 1989

[54] SINGLE-STAGE, TWO-PHASE OF FOUR-PHASE SYNCHRONOUS ELECTRIC MOTOR

[75] Inventor: Claude Oudet, Besancon, France

[73] Assignee: Portescap, Switzerland

[21] Appl. No.: 96,026

[22] PCT Filed: Oct. 30, 1986

[86] PCT No.: PCT/CH86/00149
§ 371 Date: Aug. 11, 1987
§ 102(e) Date: Aug. 11, 1987

[87] PCT Pub. No.: WO87/03751
PCT Pub. Date: Jun. 18, 1987

[30] Foreign Application Priority Data

Dec. 11, 1985 [CH] Switzerland ............ 5283/85

[51] Int. Cl.⁴ ............................................. H02K 1/22
[52] U.S. Cl. ................................ 310/268; 310/156; 310/162; 310/184; 310/185
[58] Field of Search .......... 310/49 R, 268, 162, 310/163, 164, 156, 179, 180, 181, 184, 208, 254, 185–188

[56] References Cited

U.S. PATENT DOCUMENTS

| 3,539,847 | 11/1970 | Gifford ............. | 310/49 R |
| 4,006,375 | 2/1977 | Lyman ............. | 310/49 R |
| 4,031,419 | 6/1977 | Spiesberger ....... | 310/49 R |
| 4,424,463 | 1/1984 | Musil ............. | 310/49 R |
| 4,517,478 | 5/1985 | Oudet ............. | 310/268 |
| 4,518,883 | 5/1985 | Oudet ............. | 310/49 R |
| 4,680,494 | 7/1987 | Grosjean ........... | 310/49 R |

FOREIGN PATENT DOCUMENTS 0637508 7/1983 Switzerland ............ 310/49 R

Primary Examiner—R. Skudy
Attorney, Agent, or Firm—Willian Brinks Olds Hofer Gilson & Lione Ltd.

[57] ABSTRACT

A stator of the planar magnetized rotor motor according to the invention comprises groups of polar parts and at least two control coils. On each side of the rotor, each group of polar parts surrounded by a coil is arranged adjacent to the groups which are not surrounded by a coil. This arrangement makes it possible to increase the number of active poles of the stator, thereby increasing the motor torque, in a small size, economical, simple construction motor.

4 Claims, 1 Drawing Sheet

SINGLE-STAGE, TWO-PHASE OF FOUR-PHASE SYNCHRONOUS ELECTRIC MOTOR

The present invention relates to a single-stage, two-phase or four-phase synchronous electric motor of the type comprising a permanently magnetized disc-shaped rotor part as described, for example, in Swiss Pat. No. 637 508.

In the known single-stage, two-phase motors, the number of active poles of the stator assembly, i.e. the number of locations where the variable air-gap has a minimal height, is limited, phase-wise, to 40 % of the number of poles of like type appearing on each of the planar surfaces of the magnetised rotor part. This also limits the torque of the motor for a given number of ampere-turns of the corresponding control coils.

The purpose of the present invention is in particular to increase the torque of such a motor and to provide a motor, having a particularly simple and economic construction, which is of small dimensions, in which the number of active poles can be increased beyond the aforementioned limit.

Figure 2:
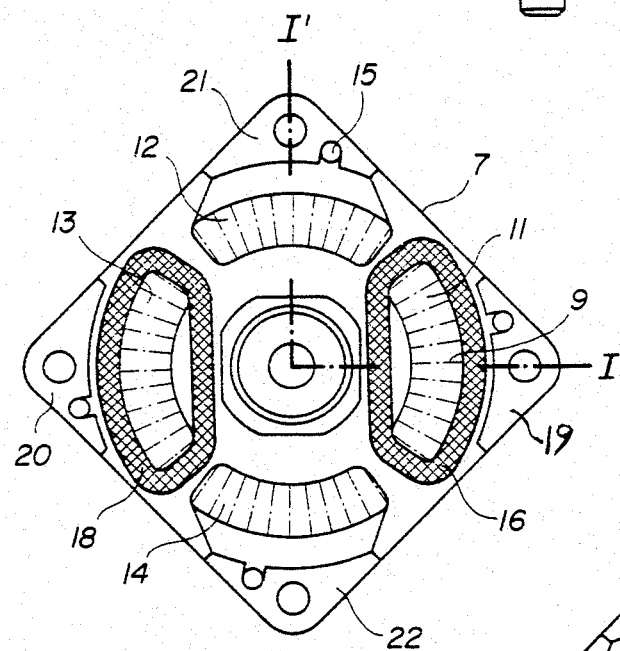
Figure 3:
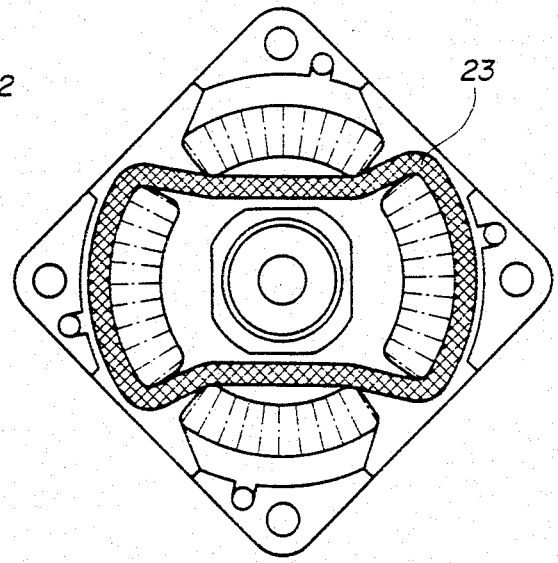

The invention, its particular features and advantages will be better understood in the light of the following description which is given, by way of example, of two embodements which are illustrated by the accompanying drawing, in which:

FIG. 1 is an axial section, along the line I—I' of FIG. 2, of a two-phase motor according to the invention and comprising two pairs of coils, FIG. 2 is a view from above of the lower stator part of the motor according to FIG. 1, and FIG. 3 is a view from above, similar to that of FIG. 2, illustrating a modified form of the motor shown in FIGS. 1 and 2, comprising two coils surrounding the shaft of the motor.

The motor shown in axial section in FIG. 1 comprises a shaft 1 on which is fixed, by means of a support member 2, an annular disc-shaped member, for example, of samarium cobalt, forming a permanently magnetized rotor part. This rotor part is magnetised axially, so as to present, on each of its planar surfaces, 50 poles of like type disposed regularly along its annular surfaces and preferably alternating with 50 poles of opposite polarity. The rotor part 3 defines a first side and a second side (not identified) in the form of a flat annular disc having a first flat surface and a second flat surface (not identified).

The shaft 1 is rotatably mounted, by means of bearings 4, 5 shown diagrammatically in FIG. 1, in a stator assembly 6 which comprises two parts, namely, a lower stator part 7 and an upper stator part 8. These stator parts are made of a magnetically permeable material which, in the present example, is sintered iron. In the vicinity of the rotor part of the motor, these stator parts have pole parts such as 9, 10. In the present example, the polar parts of each stator part form four groups corresponding to four pole pieces designated by 11, 12, 13 and 14 for the lower stator part 7. The upper stator part 8 is of the same form as the part 7, with which it is united by screws such as 15. The assembled two stator parts thus present, along an annular zone in which is disposed the magnetised rotor part 3, an air-gap of which the height, i.e. the dimension in the axial direction, varies in passing from one pole part to the following. The different pole parts may have the form of teeth of rectangular or rounded section, the crests of the different teeth forming active poles of the stator part. In FIG. 2, these crests are represented disgrammatically by radially disposed chain-dotted lines.

In the case as represented in FIG. 2, each stator part comprises four projecting pole-pieces disposed in the four quadrants around the axis of the motor shaft and thus presents two perpendicular axial planes of symmetry. Two diametrically opposite groups are associated with a like phase of the two-phase motor of this example.

The stator assembly additionally comprises electric control coils—four coils in the present case—of which three (16, 17 and 18) are visible in FIGS. 1 and 2. As is shown more particularly in FIG. 2, on each side of the rotor part 3, i.e. in each stator part, two diametrically opposite pole-pieces are surrounded by coils, such as the coils 16 and 18 of FIG. 2. The coils 16 and 18 are used for controlling the motor in one phase, while two similar coils, one of which, 17, is shown in FIG. 1, and which surround pole-pieces facing the pole-pieces 12 and 14, are used for controlling the other phase. In other words, the coils corresponding to a phase are all disposed on a same side of the rotor part, the magnetic circuit corresponding thereto being closed by solid parts, such as 19, 20, 21, 22, by which the lower and upper stator parts are in contact, thus forming a magnetic joint.

The present arrangement of the coils, according to which, on each side of a pole-piece or group of pole parts, such as 11, surrounded by a coil, there are pole-pieces or groups of pole parts, such as 12 and 14, which are not surrounded by a coil in this same stator part, permits an increase in the number of pole parts or active poles of the stator assembly along the circumference of the rotor part. As will be seen from FIG. 2, the coils 16 and 18 surround each 11 teeth, the crests of which are represented schematically by the chain-dotted lines referred to above. Thus each phase comprises 2×11 pole parts which co-operate with the mentioned 50 poles of like type formed on the rotor part. The theoretical maximum of teeth over the whole circumference being in this case 50, this means, considering both phases, that 88 % of the theoretical maximum number of pole parts are available as active pole parts.

FIG. 1 also shows a preferred arrangement of the coils such as 16, according to which each coil is preformed in such manner as to permit, firstly, the reduction to a minimum of the axial dimension of the motor and, secondly, the placing of these coils as close as possible to the pole pieces. The resulting shape of the coils is such that the portions which are further from the axis of the motor shaft are nearer the rotor part than the portions closer to the axis.

FIGS. 1 and 2 also show that the pole-pieces which do not carry a coil, such as the pole-pieces 12 and 14, do not have a recess, such as the recesses in which the coils 16 and 18 are placed. This contributes to the reduction of iron losses in the magnetic circuit.

FIG. 3 shows a modified embodiment, in which the stator parts have essentially the same form as that according to FIG. 2.

The two coils 16 and 18 of FIG. 2 are joined to form a single coil 23, which particularly permits a reduction in the number of connecting wires. In this case, the motor thus comprises two coils disposed on either side of the rotor part and each corresponding to one phase of the two-phase motor.

The motor according to FIGS. 1 and 2 may obviously be used as a four-phase motor, the connecting wires of each of the coils leaving the motor separately.

The present arrangement not only makes it possible to provide a motor which is extremely compact and of a simple and economic structure, but in particular, because of the increase in the number of active poles of the stator assembly, it permits an increase in the torque of the motor, while remaining within the limits imposed by the heating of the motor and/or the saturation of the material of the magnetic circuits as regards the number of ampere-turns of the control coils.

I claim:

1. Single-stage, two-phase or four-phase electric motor, comprising a rotor part defining a first side and a second side, said rotor part in the form of a flat annular disc having a first flat surface and a second flat surface, the flat annular disc magnetised axially in such manner as to present, on each of its flat surfaces, a series of magnetic poles disposed regularly along an annular zone, the rotor part being fast with a motor shaft mounted to be rotatable relatively to a stator assembly, the stator assembly comprising at least two stator parts of magnetically permeable material being coupled with stator pole parts disposed on either side of the rotor part so as to form an air-gap of variable height along at least a portion of the annular zone in which are disposed the magnetic poles of the rotor part, the stator pole parts constituting, on each side of the rotor part, at least two groups of pole parts, the stator assembly also comprising at least two electric control coils, each control coil surrounding at least one of said groups of said pole parts, characterised in that the groups of said pole parts and the control coils are disposed in such a manner that, on each side of the rotor part, each group of said pole parts surrounded by one of said coils is placed, from each side along the periphery of the rotor part, alongside one of said groups which is not surrounded by one of said control coils, the group which is not surrounded by one of said control coils coupled with one of said control coils surrounding one of said groups of said pole parts disposed on the other side of the rotor part.

2. Motor according to claim 1, characterised in that it comprises, on each side of the rotor part, four groups of said pole parts which are respectively disposed in four quadrants defined around the axis of the motor shaft.

3. Motor according to claim 2, characterised in that the pole parts of two diametrically opposed groups, situated on the same side of the rotor part, are surrounded by a single coil.

4. Motor according to claim 1, characterised in that the coils are formed and disposed in such manner that coil portions closer to the motor shaft are situated at a greater axial distance from one of said flat surfaces of the rotor part than coil portions further from the motor shaft.

* * * * *